United States Patent [19]
Parker

[11] 3,896,845
[45] July 29, 1975

[54] ACCUMULATOR CHARGING AND RELIEF VALVE

[75] Inventor: Donald L. Parker, Middletown, Ohio

[73] Assignee: General Motors Corporation, Detroit, Mich.

[22] Filed: June 13, 1974

[21] Appl. No.: 479,035

[52] U.S. Cl.............................. 137/493.3; 137/493.6
[51] Int. Cl............................................. F16k 17/26
[58] Field of Search........... 137/493.3, 493.4, 493.5, 137/493.6

[56] References Cited
UNITED STATES PATENTS
3,392,633  7/1966  Kokaly........................ 137/493.6 X

*Primary Examiner*—Henry T. Klinksiek
*Attorney, Agent, or Firm*—K. H. MacLean, Jr.

[57] ABSTRACT

A combination charging and relief valve for an accumulator of a hydraulic power brake booster. The valve includes a threaded body member having an end portion located within the brake booster housing separating a passage fluidly connected to a hydraulic fluid pressure source and another passage fluidly connected to a storage chamber or accumulator of the brake booster. The end portion of the valve has passage means therethrough, including an axial bore. A valve element is supported in the axial bore and may be reciprocated between closed and open positions against a spring normally holding the valve in a closed position. Valve seat portions are formed on the end of the valve body and the movable valve element providing a metal-to-metal sealing contact to prevent fluid leakage with the valve element in a closed position. The valve element has an O-ring type seal about it which contacts the end surfaces of the valve element and the valve body to form a sealing contact therewith encircling the metal-to-metal contact between the valve element and the valve body when the valve is in a closed operative position. A check valve within the movable valve element permits fluid to flow from the accumulator to the pressure source when the pressure in the accumulator exceeds a predetermined pressure level.

2 Claims, 5 Drawing Figures

PATENTED JUL 29 1975 3,896,845

ACCUMULATOR CHARGING AND RELIEF VALVE

This invention relates to an improved fluid charging and relief valve and is particularly adapted for use in hydraulic fluid brake systems. Accumulator charging valves in hydraulic brake systems are normally subjected to relatively high fluid pressures which may exceed 1000 psi. In order to maintain this pressure level in the accumulator for use in emergency braking situations, the charging valve must positively seal the accumulator chamber to prevent leakage therefrom. The present charging valve includes a valve body with a bore therein in which a valve element is supported for reciprocation. A spring normally maintains the valve element in a closed operative position against the valve body. The valve element also has a passage therein to pass fluid when it is axially reciprocated to an open operative position against a spring. This opening movement causes a port in the valve element to be moved from the end of the valve body and unblocked.

Valve seat portions on the valve element and on the end of the valve body are engaged in metal-to-metal sealing contact to prevent fluid leakage when the valve element is moved to a closed operative position. In addition, the valve element supports in encircling engagement an O-ring type seal which is compressed on opposite sides by inclined surfaces of the valve element and the valve body to provide a secondary seal about the metal-to-metal seal between the valve element and the valve body.

The utilization of a reciprocal valve element in a bore provides smooth and reliable valve action. In addition, it provides an efficient metal-to-metal seal between the elements having a relatively large seal area.

Normally, a brake booster is provided with separate relief and charging valves. The present charging and relief valve combines these two functions by providing a bleed passage in the movable valve element and a check valve in the form of a spherical valve member which is seated against the valve element by a spring. When fluid pressure in the accumulator exceeds a predetermined level, the check valve is unseated and fluid is permitted to flow past the valve member to the pressure source.

One of the desirable features of the combination charging and relief valve described herein is its compact and simple structure. It consists of only two major portions. The first is a valve body including a threaded head portion for conveniently and removably securing the valve to a brake booster housing. The valve body extends into a cavity in the accumulator housing and has a portion carrying a seal member thereon separating a first passage fluidly connected to a pressure source and a second passage fluidly connected to the accumulator. The second element is a movable valve assembly having a portion which is mounted for reciprocation within a bore in the valve body. The movable valve assembly is normally maintained in a closed operative position against the valve body by a coil spring. When a predetermined pressure differential exists across the end faces of the movable valve member, the valve member is moved to an open operative position, permitting fluid flow into the accumulator. The charging and relief valve may be removed for servicing or replacement by simply rotating the head portion and withdrawing the valve assembly.

An object of the present invention is to provide a reliable and efficient charging and relief valve for use in hydraulic systems, such as a brake booster assembly, which may be expected to be exposed to pressures of over 1000 psi.

A still further object of the present invention is to provide a smooth operating and efficient charging valve, including a valve body with a bore therein in which a valve member is mounted for reciprocation and having valve seat portions on the valve member and the valve body which engage in metal-to-metal sealing contact to prevent fluid leakage when the valve member is in a closed operative position.

A still further object of the present invention is to provide a reliable and efficient charging valve for hydraulic systems, such as a brake booster assembly, in which an O-ring seal is sealingly engaged on opposite faces by a movable valve member and a valve body which have inclined surfaces to compress the O-ring and make contact therewith.

Further objects and advantages of the present invention will be more readily apparent from the following detailed description, reference being had to the drawings, in which a preferred embodiment of the invention is illustrated.

Figure 1:
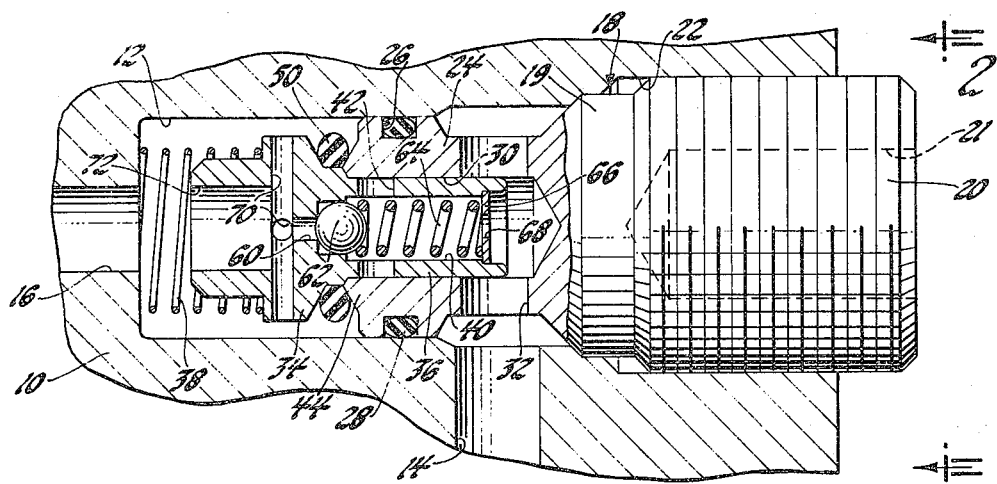
FIG. 1 is a fragmentary sectioned view of a hydraulic brake housing showing the present charging and relief valve assembly in a closed operative position.
Figure 4:
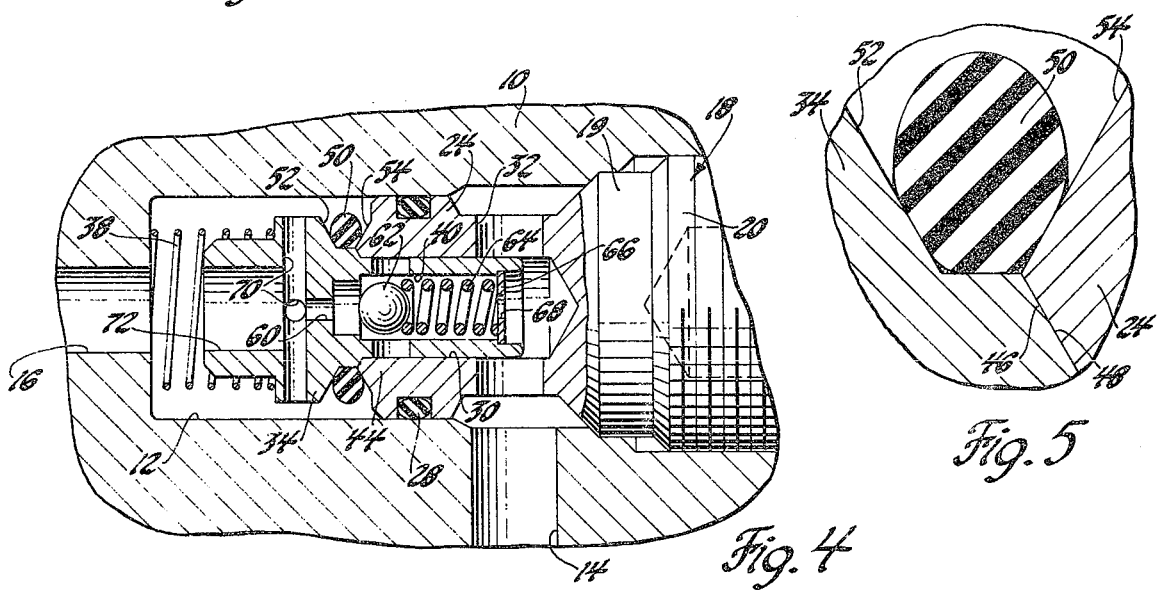
Figure 5:
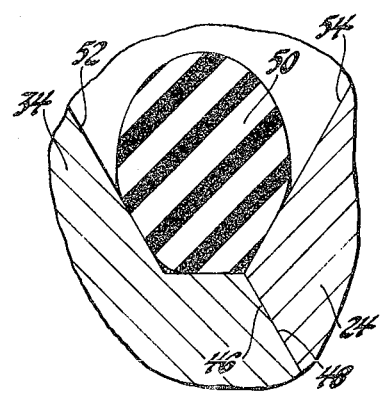

FIG. 4 is a view similar to FIG. 1 but showing the charging and relief valve in a pressure release operative mode, in which excessive pressure from the accumulator is relieved; and FIG. 5 is an enlarged fragmentary sectioned view of the charging and relief valve in a closed operative position showing engagement between the valve members and an O-ring seal which provides supplemental sealing action.

In FIG. 1, a brake booster housing 10 is illustrated. The brake booster is of the hydraulic type having a fluid pressure accumulator shown in a co-pending U.S. application, Ser. No. 419,090 which was filed Nov. 26, 1973 and is entitled "Accumulator Piston Stop". Housing 10 has a bore 12 therein between passages 14 and 16. Passage 14 extends through housing 10 and is fluidly connected to a fluid pressure source, such as a power steering pump in a motor vehicle. Passage 16 extends through the housing 10 to a variable volume storage chamber or accumulator for fluid, as shown in the aforementioned application.

Figure 2:
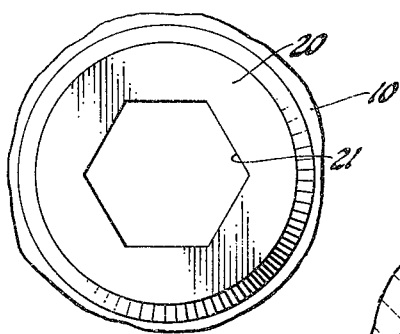
FIG. 2 is a sectioned view of the charging and relief valve assembly taken along section line 2—2 in FIG. 1 and looking in the direction of the arrows.

A valve assembly 18 includes a valve body member 19 with an enlarged threaded head portion 20 which is threadably attached to housing 10 in a bore 22. As shown in FIG. 2, the enlarged threaded head portion 20 has a recessed hexagonal-shaped bore 21 adapted to be engaged by a similarly shaped wrench to rotate the valve assembly 18 and thereby remove the assembly from the housing 10. The valve body 19 also includes an elongated end portion 24 having an annular channel or groove 26 therein which supports an annular seal member 28 therein adapted to engage the surrounding surface 12 of the housing 10. This effectively directs fluid flow between passages 14 and 16 through the valve assembly 18.

Figure 3:
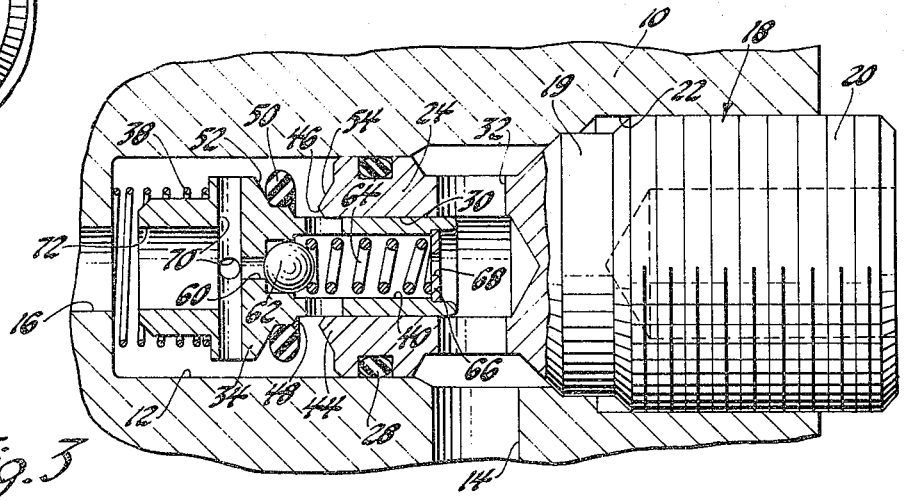
FIG. 3 is a sectioned view similar to FIG. 1 but showing the charging and relief valve assembly in an open operative position during charging of the accumulator with fluid pressure.

The valve body 24 has an axially extending bore 30 therethrough intersected by radial ports 32. An axially movable valve member or element 34 has an elongated end portion 36 which is received within the bore 30 of the valve body 24 for reciprocal movement. A coil spring 38 extends between housing 10 and the valve element 34 to bias the valve element toward the valve body, as shown in FIG. 1, into a closed operative position. The valve element 34 has an axially directed passage 40 therethrough and radially directed passages 42 therein to conduct fluid from the passage 14 to the passage 16 when the valve element 34 is moved to the left into an open charging position, as shown in FIG. 3. In this open position, ports 42 are unblocked by movement from the end 44 of the valve body 24. The valve element 34 is opened by differential pressure forces of fluid on opposite sides of the valve element.

The end 44 of portion 24 has a valve seat 46 formed thereon which is best shown in FIG. 3. The valve seat portion 46 is adapted to be sealingly engaged by a corresponding valve seat 48 on the movable valve element 34 located at the base of elongated portions 36. The resulting metal-to-metal engagement of seats 46 and 48 efficiently prevent fluid leakage between passages 14 and 16 when the valve is in a closed operative position. The metal-to-metal contact extends over a substantial sealing area to provide an efficient and effective fluid seal as shown in FIG. 5.

Because the valve assembly 18 is subjected to large pressure differentials of over 1000 psi., the improved valve is provided with a supplemental or secondary seal encircling the metal-to-metal seal. Specifically, in the illustrated embodiment, an O-ring type seal 50 is supported in encircling engagement about the valve element 34. Inclined surfaces 52 and 54 are formed respectively on the movable valve element and the end 44 of portion 24. Surfaces 52, 54 engage opposite sides of the seal member 50 when the valve member 34 is in the closed position shown in FIGS. 1 and 5. As best shown in FIG. 5, opposite sides of the O-ring 50 are slightly compressed by the surfaces 52 and 54. This causes the O-ring 50 to sealingly engage the valve element 34 and the end of valve body 44 to provide a supplemental seal encircling the primary seal formed by seats 46 and 48.

The valve assembly 18 also includes a relief valve portion entirely contained within the valve element 34 and shown in a closed operative position in FIGS. 1 and 3 and in an open operative position in FIG. 4. A relief passage 60 in the movable element 34 communicates passage 16 with axial passage 40 in the valve element 34. The passage 60 is normally blocked by a ball-type check valve 62 maintained against element 34 by spring 64. The spring 64 extends between check valve 62 and an orifice plate 66 which is secured to the valve member by staking or other attachment means. The orifice plate 66 has a port 68 therein which limits fluid flow to and from the accumulator to prevent excessive flow. As can be seen in FIG. 4, a predetermined large pressure in the accumulator will move the valve 62 to the right and away from the end of passage 60 to permit fluid to flow from the passage 16 to passage 14. The radial passages 70 and the large passage 72 in the valve element 34 fluidly connect passage 16 with the ports 42 and the passage 60 in all positions of the valve.

Although the charging and relief valve, as described above and illustrated in the drawings, is a preferred embodiment, other embodiments may be adapted.

What is claimed is as follows:

1. In a charging valve adapted to be removably attached to a brake booster housing for controlling the introduction of pressurized fluid to an accumulator, a valve body having an enlarged cylindrical head with a threaded portion adapted to be removably attached in a corresponding threaded bore in said housing, said valve body having an elongated end portion extending into a cavity in the brake booster housing between a first passage fluidly connected to a fluid pressure source and a second passage fluidly connected to an accumulator; annular seal means encircling said end portion and engaging the surrounding surface of the housing to prevent fluid communication therebetween; said end portion having passage means therein including an axially directed cylinder bore and a radially directed port connected to said first passage; a movable valve member having an elongated cylindrical portion extending into said bore for reciprocal movement therein, and having a passage including an axially directed portion fluidly connected to said first passage and a radially directed portion normally covered by the surrounding end of said valve body when in a closed operative position and moved with said movable valve member to an open operative position away from said end portion of said valve body to interconnect said first and second passages, said end portion of said movable valve member having a valve seat formed thereabout, a corresponding valve seat formed on the end of said valve body adapted to be engaged by the valve seat of the movable valve member when in a closed operative position thereby providing a primary metal-to-metal seal therebetween, a spring biasing said movable valve member toward its closed operative position with the valve seats engaged, an annular resilient seal member encircling said valve seats when in a closed operative position, inclined surfaces on said movable valve member and on said valve body contacting opposite sides of said seal member when in a closed operative position and thereby compressing portions of said seal member to provide a secondary seal about said primary metal-to-metal seal.

2. In a charging and relief valve assembly for a brake booster and a housing and an accumulator, a valve body having an enlarged cylindrical head with a threaded portion adapted to be attached in a corresponding threaded bore in said housing, thus providing an easily removable connection therebetween, said valve body having an elongated end portion extending into a cavity in the brake booster housing between a first passage fluidly connected to a fluid pressure source and a second passage fluidly connected to the accumulator annular seal means encircling said end portion and engaging the surrounding surface of the housing to prevent fluid flow therebetween, said end portion having an axially directed bore therein and a radially directed passage fluidly connected to said first passage, a movable valve member having an elongated cylindrical portion extending into said bore for reciprocal movement therein and having a passage including an axially directed portion fluidly connected to said first passage and a radially directed portion normally covered by the surrounding end of said valve body when in a closed operative position and moved with said movable valve member to an open operative position away from said valve body to interconnect said first passage and said second passage, said elongated end portion having a valve seat formed thereabout, a corresponding valve seat formed on the end of said valve body adapted to be engaged by the valve seat of the movable valve member when in a closed operative position thereby providing a primary metal-to-metal seal therebetween, a spring extending between said housing and the movable valve member biasing the valve member toward a closed operative position with said valve seat portions engaging one another, an annular resilient seal member encircling said valve seats when in a closed operative position, annular inclined surfaces on said valve body and said movable member contacting opposite sides of said seal member when in a closed operative position and thereby compressing portions of the seal member to provide a secondary seal encircling the primary metal-to-metal seal, relief valve means in said movable valve member including a spherical valve member biased by a spring against the end of said movable valve member, a bleed passage in the end of said movable valve member interconnecting said first and second passages whereby a predetermined fluid pressure differential across said relief valve moves it away from said bleed passage to permit fluid flow from said second passage to said first passage.

* * * * *